(12) United States Patent
Liang et al.

(10) Patent No.: US 12,169,144 B2
(45) Date of Patent: Dec. 17, 2024

(54) RECONFIGURABLE POLARIZATION IMAGING SYSTEM

(71) Applicant: Arizona Board of Regents on Behalf of the University of Arizona, Tucson, AZ (US)

(72) Inventors: Rongguang Liang, Tucson, AZ (US); Jian Liang, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 325 days.

(21) Appl. No.: 17/636,730

(22) PCT Filed: Aug. 20, 2020

(86) PCT No.: PCT/US2020/047269
§ 371 (c)(1),
(2) Date: Feb. 18, 2022

(87) PCT Pub. No.: WO2021/035090
PCT Pub. Date: Feb. 25, 2021

(65) Prior Publication Data
US 2022/0268632 A1 Aug. 25, 2022

Related U.S. Application Data

(60) Provisional application No. 62/889,782, filed on Aug. 21, 2019.

(51) Int. Cl.
*G01J 4/04* (2006.01)
*G01J 3/02* (2006.01)
*G01J 3/447* (2006.01)

(52) U.S. Cl.
CPC .............. *G01J 4/04* (2013.01); *G01J 3/0229* (2013.01); *G01J 3/447* (2013.01)

(58) Field of Classification Search
CPC .......... G01J 3/2823; G01J 3/36; G01J 3/0208; G01J 2003/2826; G01J 3/2803;
(Continued)

(56) References Cited

U.S. PATENT DOCUMENTS 6,008,492 A 12/1999 Slater et al.
9,217,671 B2 * 12/2015 Gommans .............. G01J 1/0411
(Continued)

FOREIGN PATENT DOCUMENTS

CN 107024275 A 8/2017
CN 107356333 B * 8/2018 .............. G01J 3/447
(Continued)

OTHER PUBLICATIONS

Chen, Zhenyue, et al., "Calibration method of microgrid polarimeters with image interpolation," Appl. Opt. 54, 995-1001 (2015).
(Continued)

*Primary Examiner* — Michael P Stafira
(74) *Attorney, Agent, or Firm* — Perkins Coie LLP

(57) ABSTRACT

Methods, apparatus and systems that relate to a low-cost reconfigurable polarimetric imaging are described. One example polarization imaging system includes a lens positioned to receive light reflected from one or more objects, and a spectral-polarization filter positioned at an aperture plane of the lens to filter the light received by the lens. The polarization imaging system can further include a sensor positioned to detect the filtered light from the spectral-polarization filter to form a polarization image of the one or more objects. The spectral-polarization filter comprises a first array of multiple spectral filters and a second array of multiple polarizers.

21 Claims, 15 Drawing Sheets

(58) Field of Classification Search
CPC ............ G01J 3/0229; G01J 3/0232; G01J 2005/0077; G01J 3/0256; G01J 5/0014; G01J 2003/2806; G01J 3/26; G01J 3/447; G01J 3/02; G01J 3/0224; G01J 3/021; G01J 3/28; G01J 3/0205; G01J 3/0291; G01J 2003/1213; G01J 5/0804; G01J 3/0297; G01J 3/51; G01J 5/0806; G01J 3/0262; G01J 4/00; G01J 3/513; G01J 3/10; G01J 2003/1226; G01J 2003/1282; G01J 3/0264; G01J 3/027; G01J 3/0289; G01J 9/02; G01J 3/12; G01J 3/18; G01J 1/0437; G01J 3/0272; G01J 3/42; G01J 3/0294; G01J 5/53; G01J 3/4406; G01J 3/46; G01J 5/0802; G01J 5/80; G01J 3/0278; G01J 4/04; G01J 1/04; G01J 1/0411; G01J 1/30; G01J 1/4228; G01J 1/4257; G01J 2003/1269; G01J 2003/283; G01J 2003/451; G01J 3/0213; G01J 3/0286; G01J 3/4412; G01J 3/45; G01J 5/20; G01J 1/0204; G01J 1/0474; G01J 1/0488; G01J 1/0492; G01J 1/06; G01J 2003/1217; G01J 2003/1221; G01J 2003/123; G01J 2003/1239; G01J 3/0218; G01J 5/0003; G01J 5/58; G01J 2003/1247; G01J 2003/2869; G01J 2005/604; G01J 3/0227; G01J 3/08; G01J 3/1804; G01J 3/24; G01J 3/32; G01J 4/02; G01J 5/0808; G01J 5/0896; G01J 5/602; G01J 9/00; G01J 2003/104; G01J 3/0259; G01J 3/04; G01J 3/1256; G01J 3/50; G01J 3/504; G01J 5/0066; G01J 5/02; G01J 5/026; G01J 5/047; G01J 5/061; G01J 5/07; G01J 5/08021; G01J 1/4204; G01J 2003/2813; G01J 2003/2816; G01J 2009/0284; G01J 2009/0288; G01J 3/108; G01J 3/501

See application file for complete search history.

(56) References Cited

U.S. PATENT DOCUMENTS

| 2009/0185185 | A1* | 7/2009 | Shakespeare | G01N 21/3563 356/406 |
|---|---|---|---|---|
| 2016/0069743 | A1 | 3/2016 | Mcquilkin et al. | |
| 2016/0273963 | A1 | 9/2016 | Herrick et al. | |
| 2018/0107015 | A1 | 4/2018 | Dümpelmann et al. | |

FOREIGN PATENT DOCUMENTS

| CN | 109029726 A | * | 12/2018 | ............ G01J 3/0294 |
|---|---|---|---|---|
| CN | 110771135 A | * | 2/2020 | ............ G02B 13/001 |
| WO | WO-2015198562 A2 | * | 12/2015 | ............ A61B 5/0075 |
| WO | 2018113938 A1 | | 6/2018 | |

OTHER PUBLICATIONS

Chen, Zhenyue, et al., "RGB-NIR multispectral camera," Opt. Express 22, 4985-4994 (2014).

Chu, Jinkui, et al., Integrated polarization dependent photodetector and its application for polarization navigation. IEEE Photonics Technology Letters 26, 469-472 (2014).

International Search Report & Written Opinion mailed Jan. 11, 2021 for International Patent Application No. PCT/US2020/047269 (9 pages).

Ju, Haijuan, et al., "Method for Mueller matrix acquisition based on a division-of-aperture simultaneous polarimetric imaging technique," Journal of Quantitative Spectroscopy and Radiative Transfer 225, 39-44 (2019).

Liang, Jian, et al., "Polarimetric dehazing method for dense haze removal based on distribution analysis of angle of polarization," Opt. Express 23, 26146-26157 (2015).

Mudge, Jason, et al., "Near-infrared simultaneous Stokes imaging polarimeter: integration, field acquisitions, and instrument error estimation," in Polarization Science and Remote Sensing (SPIE, 2011), p. 81600B.

Ohfuchi, Takafumi, et al., "Polarization imaging camera with a waveplate array fabricated with a femtosecond laser inside silica glass," Opt. Express 25, 23738-23754 (2017).

Park, Hyunsung, et al., "Elliptical silicon nanowire photodetectors for polarization-resolved imaging," Opt. Express 23, 7209-7216 (2015).

Parnet, Francois, et al., "Free-space active polarimetric imager operating at 1.55 um by orthogonality breaking sensing," Opt. Lett. 42, 723-726 (2017).

Shinoda, Kazuma, et al., "Snapshot multispectral polarization imaging using a photonic crystal filter array," Opt. Express 26, 15948-15961 (2018).

Tu, Xingzhou, et al., "Division of amplitude RGB full-Stokes camera using micro-polarizer arrays," Opt. Express 25, 33160-33175 (2017).

Tyo, J. Scott, et al., "Review of passive imaging polarimetry for remote sensing applications," Appl. Opt. 45, 5453-5469 (2006).

Zhang, Zhigang, et al., "Nano-fabricated pixelated micropolarizer array for visible imaging polarimetry," The Review of scientific instruments 85, 105002 (2014).

* cited by examiner

RECONFIGURABLE POLARIZATION IMAGING SYSTEM

RELATED APPLICATIONS

This patent document is a 371 National Phase Application of International Patent Application No. PCT/US2020/047269, filed Aug. 20, 2020, which claims priority to the provisional application with Ser. No. 62/889,782, titled "Reconfigurable Polarization Imaging System," filed Aug. 21, 2019. The entire contents of the above noted applications are incorporated by reference as part of the disclosure of this document.

TECHNICAL FIELD

The subject matter of this patent document relates generally to polarimetric imaging, and in particular to polarimetric imaging methods and systems based on spectral-polarization filtering.

BACKGROUND

Polarized light usually contains many unique information that cannot be perceived by the human eye. Various polarimetric imaging techniques and systems have been developed to capture and process the information contained in a polarized light for imaging and other applications. The division of time method is one such technique that is very simple and can achieve high spatial resolution but is not suitable for fast-moving targets due to low temporal resolution. The division of amplitude and the division of aperture are examples of other polarimetric imaging schemes that can simultaneously obtain multiple polarized images, but the systems are relatively complex and require accurate image registration and calibration. Recently with the development of the focal plane polarization sensor with pixelated micropolarizer array, another technique called snapshot polarization imaging has been developed. However, the spatial resolution obtained with this technique is limited, and no circular or elliptical polarized information can be measured. Accordingly, there is still a need to produce a low-cost reconfigurable polarization imaging system with improved spatial resolution.

SUMMARY OF CERTAIN EMBODIMENTS

The techniques disclosed herein can be implemented in various embodiments to achieve a reconfigurable polarimetric imaging scheme based on spectral-polarization filtering.

One aspect of the disclosed embodiments relates to a polarization imaging system that includes a first lens or set of lenses positioned to receive light from one or more objects, and a spectral-polarization filter positioned at an aperture stop of the polarization imaging system to filter the received light. The spectral-polarization filter of the polarization imaging system comprises an array of multiple spectral filters and an array of multiple polarizers that are positioned in cascade to modify both spectral content and polarization of the light that enters the spectral-polarization filter. The light that exits the spectral-polarization filter is directed to a sensor positioned to detect filtered light from the spectral-polarization filter at an image plane of the polarization imaging system.

Another aspect of the disclosed embodiments relates to a method for polarization imaging that includes a process of positioning a spectral-polarization filter at an aperture stop or in front of a lens that is configured to receive light from one or more objects, wherein the spectral-polarization filter comprises a first array of multiple spectral filters and a second array of multiple polarizers. The method further includes a process of obtaining a polarization image of the one or more objects using a sensor that is positioned to detect filtered light from the spectral-polarization filter.

DETAILED DESCRIPTION

Figure 1A:
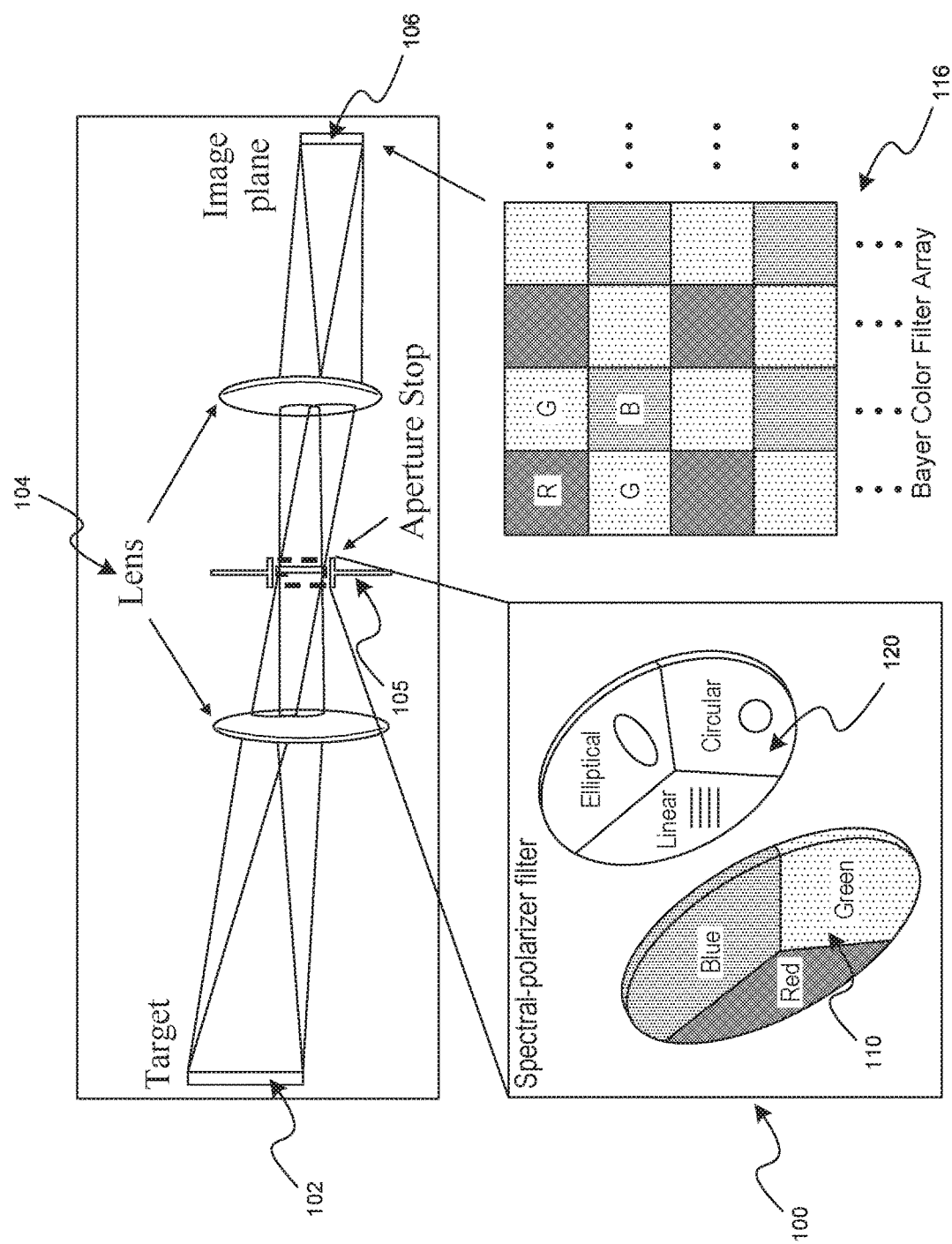
FIG. 1A illustrates an example configuration of a system using spectral-polarization filtering.
Figure 1B:
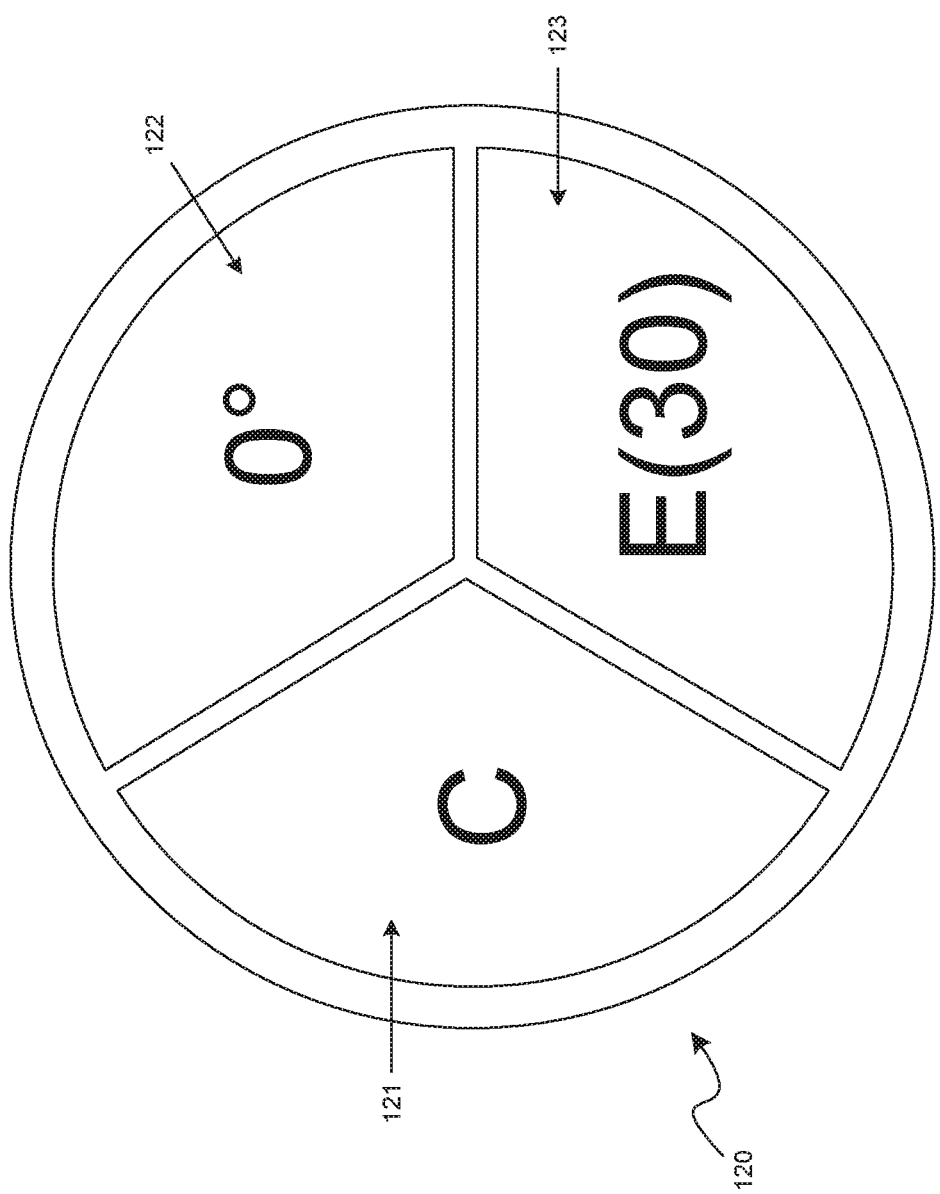
FIG. 1B illustrates an example implementation of a polarizer plate having a circular polarizer element, a linear polarizer element, and an elliptical polarizer element.
Figure 1C:
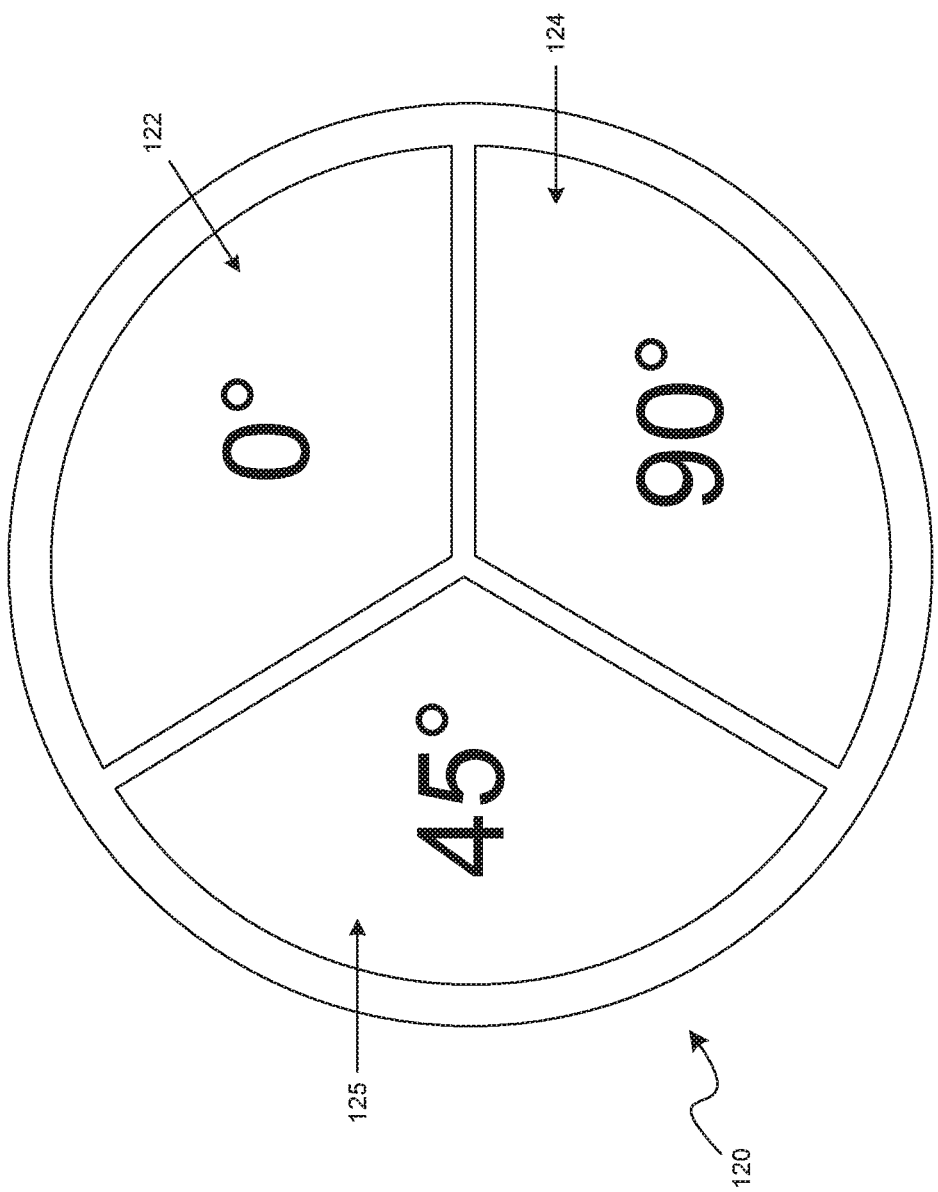
FIG. 1C illustrates an example implementation of a polarizer plate having three linear polarizer elements.
Figure 1D:
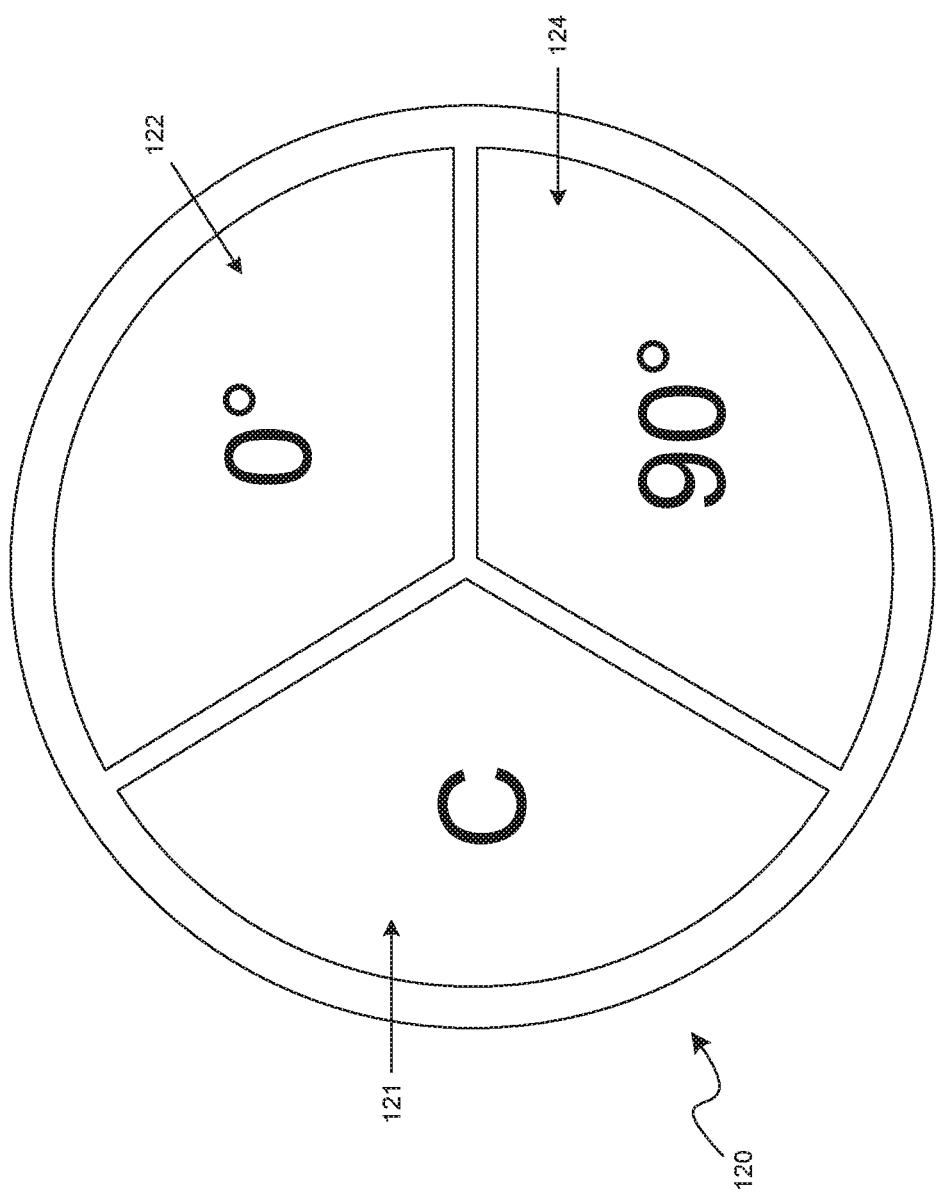
FIG. 1D illustrates an example implementation of a polarizer plate having a circular polarizer element and two linear polarizer elements.

The techniques disclosed herein overcome the shortcomings of prior systems and can be implemented in various embodiments to provide a reconfigurable polarimetric imaging system that uses spectral-polarization filters. FIGS. 1A-1D illustrate example configurations using the spectral-polarization filtering. One of the features is to use three color channels of a color camera to capture three different polarized images simultaneously. As shown in FIG. 1B-1D, the polarization state of each color channel is reconfigurable for different needs. The example polarizers in the polarizer plate 120 are illustrated as being linear, circular, and elliptical polarizers, and their orientations can be specified individually. The spectral-polarization filter 100 can be a combination of a bandpass filter plate 110 and a polarizer plate 120. It can be placed in the aperture stop 105 of the camera lens 104 as shown in FIG. 1A. Considering the fact that the light collected by each pixel fully samples the exit pupil of the lens and the beam size at the aperture is the smallest, positioning the spectral-polarization filter 100 at the aperture stop 105 provides the best light efficiency. A sensor 106 at the image plane receives the light that has passed through the spectral-polarization filter 100. The sensor 106 includes a spectral filter to capture different spectral components of the receive light. FIG. 1A illustrates the commonly-used Bayer filter 116 that has two Green channels, one Red channel and one Blue channel.

FIG. 1B illustrates an example implementation of the polarizer plate 120 having the following constituent polarizer elements: a circular polarizer 121, a linear polarizer 122, and an elliptical polarizer 123. FIG. 1C illustrates a polarizer plate 120 having three linear polarizers 122, 124, and 125. FIG. 1D illustrates a polarizer plate 120 having a circular polarizer 121, a linear polarizer 122, and a linear polarizer 124. Various implementations of the polarizer plate 120 can have various numbers and types of polarizer elements not limited to the example implementations described above.

Figure 2A:
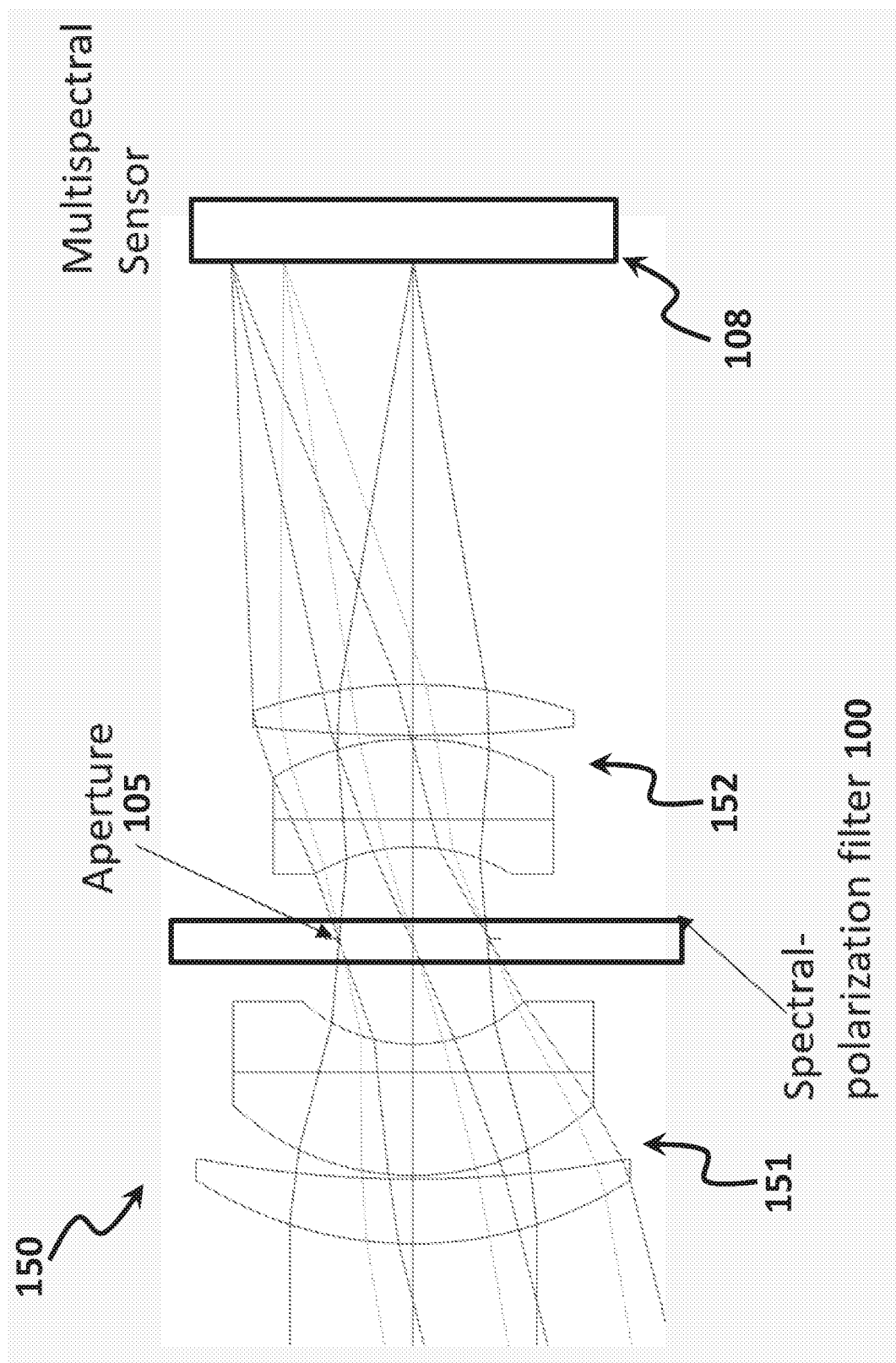
FIG. 2A illustrates an example configuration of a spectral-polarization camera and the associated ray diagram.

FIG. 2A illustrates an example configuration of a spectral-polarization camera 150 and the associated ray diagram. In this configuration, the lens 151 on the far left is positioned to receive light from a target object (not shown). A spectral-polarization filter 100 is positioned at the aperture stop (or the aperture plane) 105 of the lens. The light that is received by the lens (or lenses) 151 on the left-hand side is incident on the spectral-polarization filter 100; the light transmitted through the spectral-polarization filter 100 is received by one or more lenses 152 that direct the light to a multispectral sensor 108 positioned to receive light and to form polarized images of the target object. In the configuration of FIG. 2A, the spectral-polarization filter 100 is positioned at the aperture stop 105, which is positioned between the two sets of lenses 151 and 152.

Figure 2B:
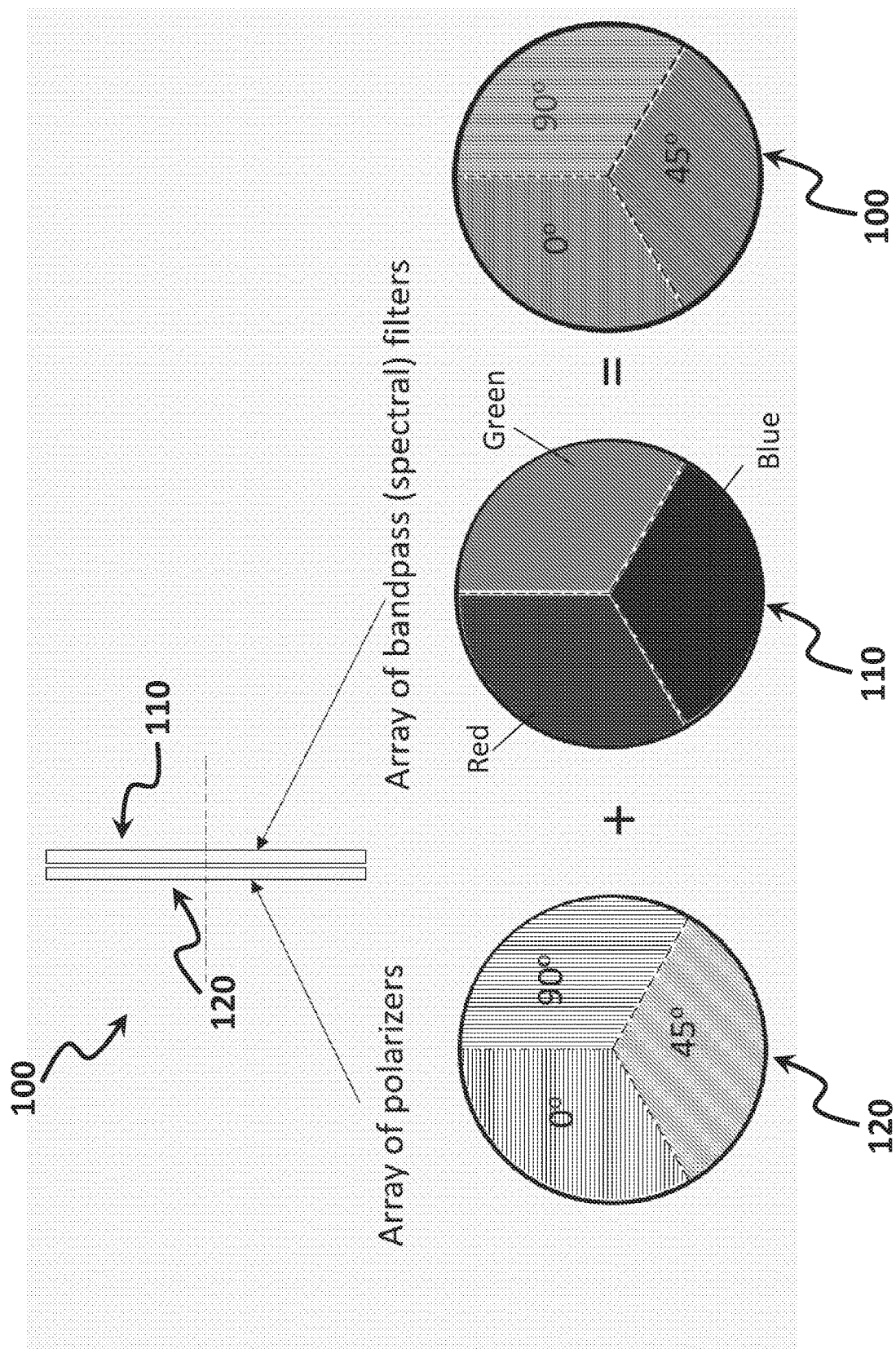
FIG. 2B illustrates an example configuration of a spectral-polarization filter.

FIG. 2B illustrates an example configuration of a spectral-polarization filter 100. The filter includes an array of polarizers 120. For example, multiple linear polarizers with different directions of linear polarization (e.g., 0, 45 and 90 degrees, as indicated in FIG. 2B) can form a multi-segmented array of polarizers 120. The filter 100 also includes an array of spectral filters 110. The array of spectral filters 110 can include multiple spectral filters, each allowing a different band of wavelengths to pass therethrough. In some embodiments, the spectral-polarization filter 100 can be constructed using a piece of transparent material (e.g., a thin parallel plate made from glass) positioned between the array of polarizers 120 and the array of spectral filters 110 to couple the two together. In some embodiments, the center of the array of polarizers 120 corresponds to the center of the array of spectral filters 110 (e.g., the centers can be coupled together) to allow the two arrays to rotate with respect to each other. This way, multiple combinations of polarizations and wavelength bands can be easily configured by rotating one or both of the filters. In some embodiments, more than two filters (e.g., two polarization filters, and one spectral bandpass filter) can be positioned in cascade to provide an additional level of control and enhanced configurability.

Figure 2C:
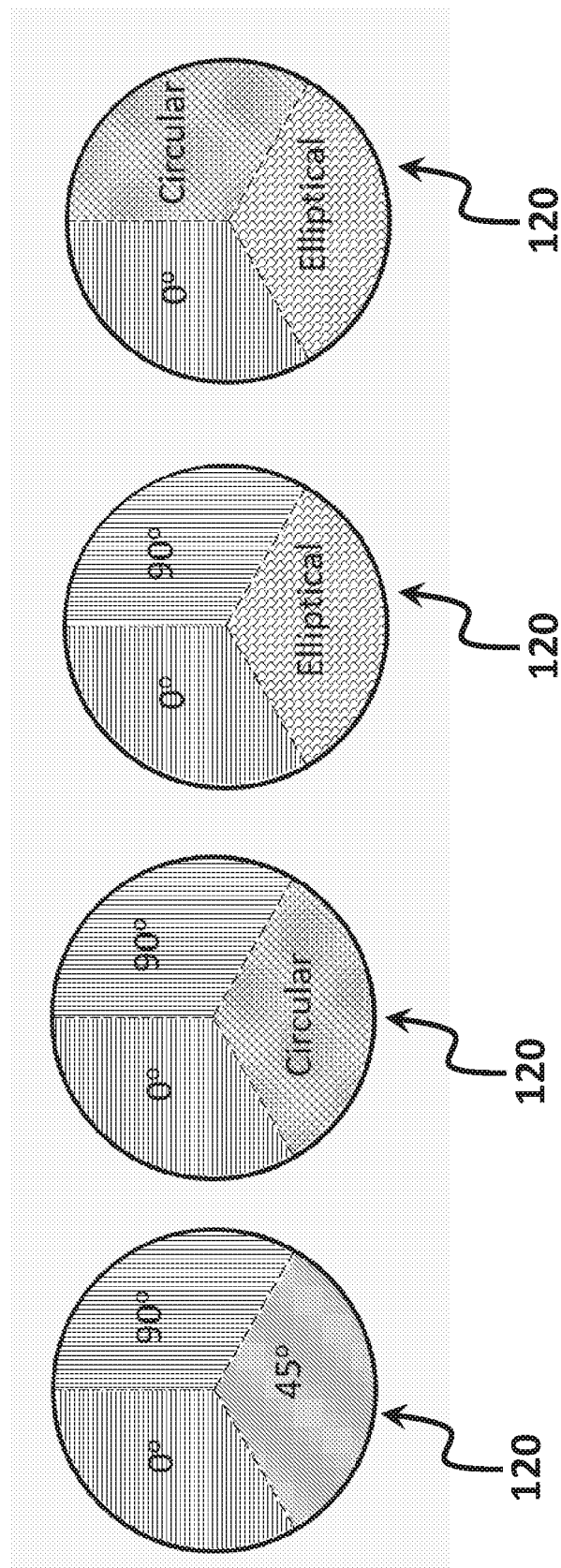
FIG. 2C illustrates example configurations of an array of polarizers.

In some embodiments, the array of polarizers 120 includes polarizers that produce different polarization states. For example, as shown in FIG. 2C, the array can include linear polarizers of different degrees, circular polarizers, and/or elliptical polarizers.

Figure 2D:
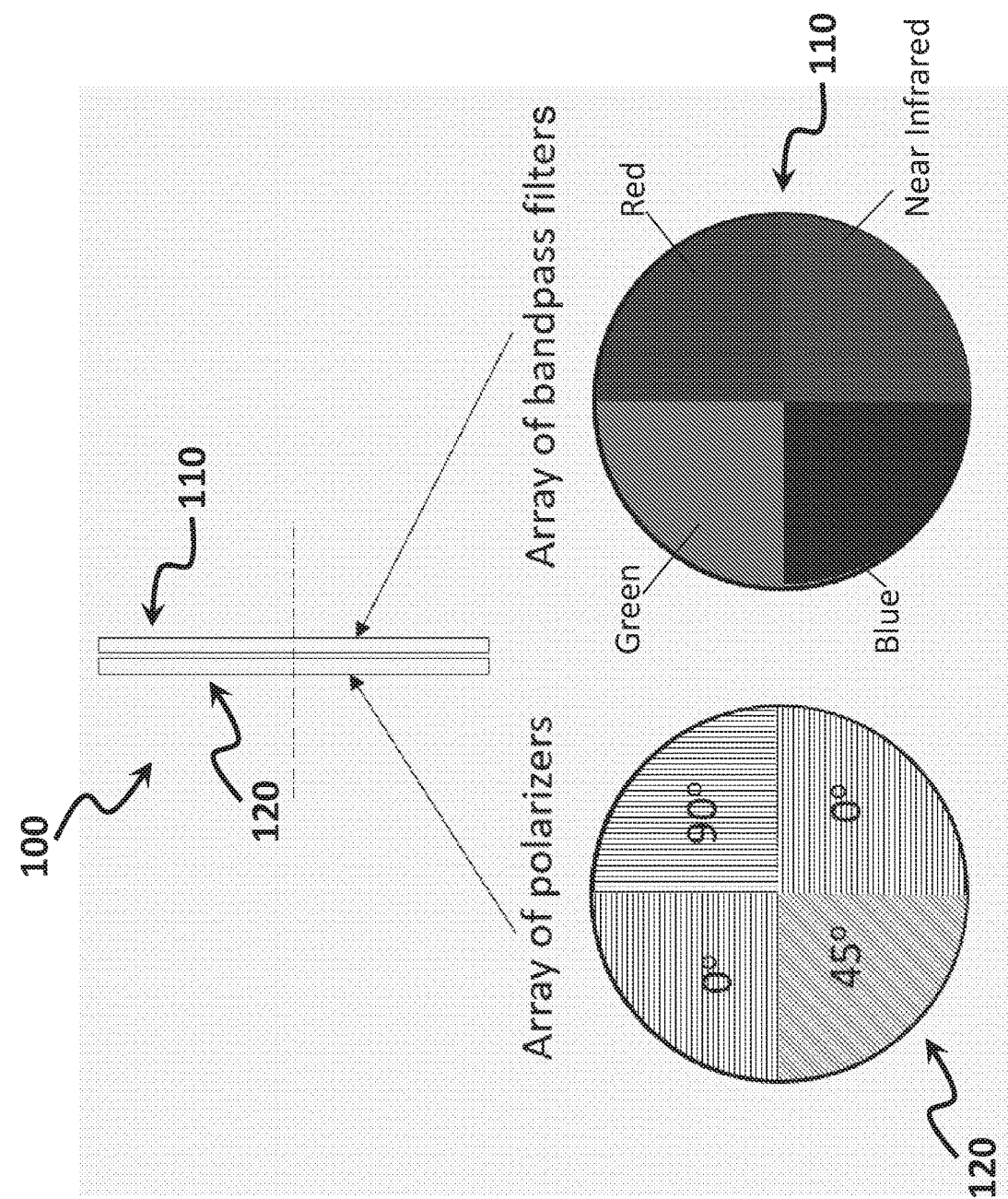
FIG. 2D illustrates an example spectral-polarization filter that includes four bandpass filters and four corresponding polarizers.

Typically, three bandpass filters are used for the conventional color camera, corresponding to the Red, Green, and Blue (RGB) channels. However, a filter plate with four or more bandpass filters can be implemented for the sensor. For example, in some embodiments, a sensor with Blue (B), Green (G), Red (R), and near infrared (NIR) channels can be constructed as well. FIG. 2D illustrates an example spectral-polarization filter 100 that includes four bandpass filters and four corresponding polarizers. In this example, the spectral transmission band of each bandpass filter can be narrower than that of the corresponding filter in the focal plane to reduce the crosstalk.

Figure 2E:
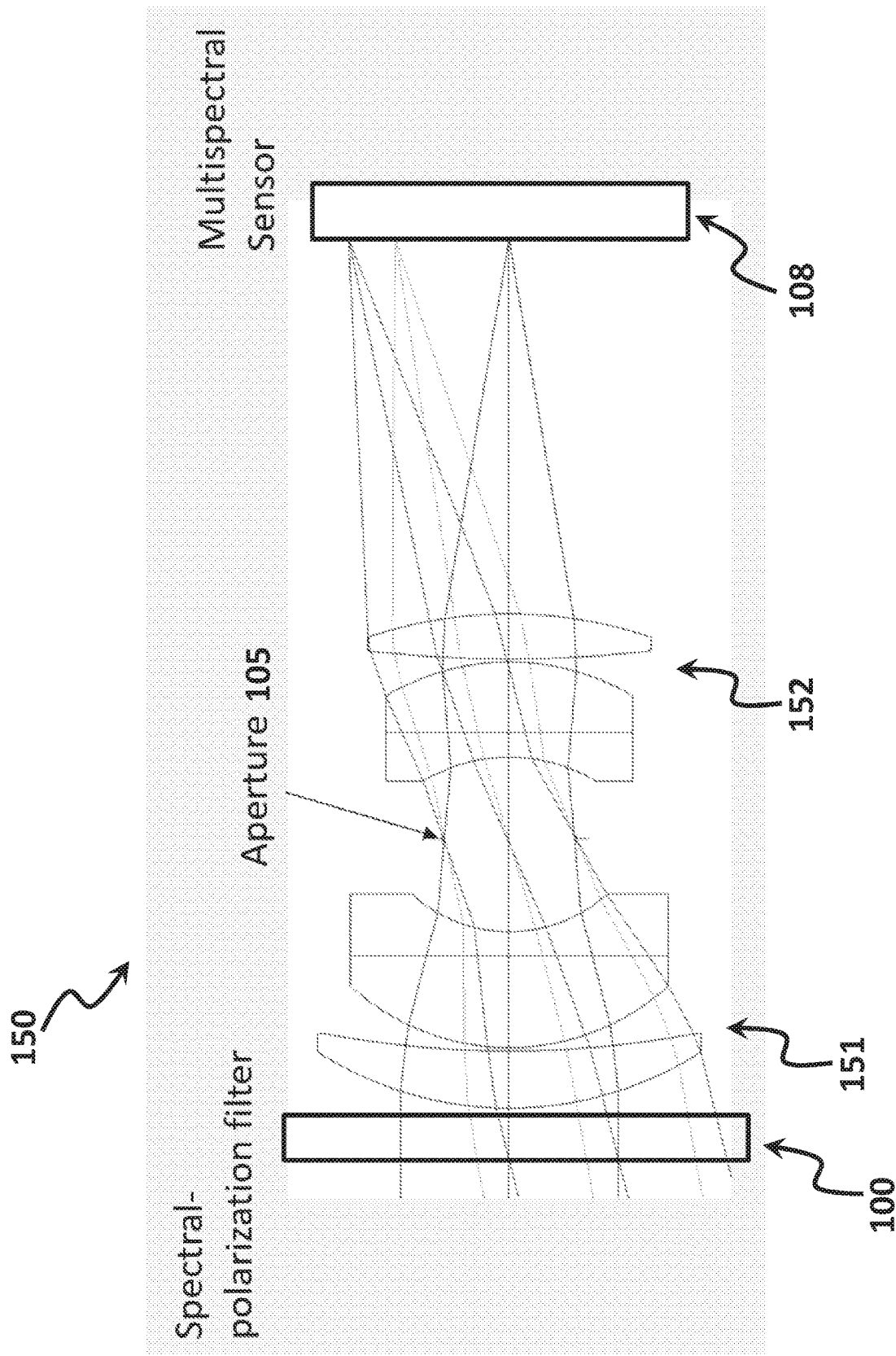
FIG. 2E illustrates an example configuration of a spectral-polarization camera.

FIG. 2E illustrates another example configuration of a spectral-polarization camera 150. In this configuration, the spectral-polarization filter 100 is positioned at the entrance lens 151 so that a conventional color camera can be easily adapted to capture polarization states at a low cost. For example, a spectral-polarization filter disclosed herein may be constructed at a cost of $20 or less as compared to commercial chromatic polarization cameras, which typically cost more than $2000. The configuration in FIG. 2E is especially suited for applications where the exact position of the aperture stop 105 is inside of the camera system or is not otherwise readily accessible. While this configuration may introduce some errors or artifacts due to crosstalk, it provides a very low-cost approach to allow for fast estimation of polarization states.

In one experimental setup, a conventional color camera (BFS-U3-51S5C-C, FLIR) with 2448×2048 pixels was used as the detector. A commercial chromatic polarization camera (PHX505-QC, Lucid) with the same number of pixels (2448×2048) was used to compare the performance. The chromatic polarization camera used Sony's IMX250MZR polarization CMOS sensor, in which each of the RGB channels can obtain four images with 0°, 45°, 90°, and 135° linear polarization. Three spectral-polarization filters were prepared to demonstrate the reconfigurability to capture circular, linear and elliptical polarized information as shown in FIGS. 1B-1D.

It is noted that the image contrast may be slightly lower than the ordinary color camera due to stray light, diffraction, and pupil obscuration caused by the filter boundaries and mechanical mount. To calibrate the setup to minimize the errors from the crosstalk among the three spectral filters, the uniform white light emitting from the integrating sphere was used as the light source. First, the three spectral filters were positioned separately in front of the camera. The exit port of the integrating sphere was imaged and the response ratio in different color channels of the imaging sensor was calculated. The intensity obtained in the camera can be expressed as:

$$I_R = n_R^R I^R + n_R^G I^G + n_R^B I^B$$

$$I_G = n_G^R I^R + n_G^G I^G + n_G^B I^B,$$

$$I_B = n_B^R I^R + n_B^G I^G + n_B^B I^B \quad \text{Eq. (1)}$$

Here, n represents the transmittance ratio. (R, G, B) in the subscript represent the color channel of the imaging sensor, and (R, G, B) in the superscript represent the spectral bandpass filter. $I^R$, $I^G$ and $I^B$ are the transmission after the spectral-polarization filters, and each transmission has a certain polarized state. $I_R$, $I_G$ and $I_B$ are the images captured by RGB channels of the color camera, respectively, as, for example, shown in the configuration illustrated in FIG. 1A or FIG. 2A. From Eq. (1), it can be seen that the images of each color channel is not exactly equal to the corresponding transmission over the filter due to the crosstalk. This is the main source of the polarization detecting error. Therefore, the transmission from the obtained images are extracted. Here, Eq. (1) can be rewritten as:

$$\begin{pmatrix} I_R \\ I_G \\ I_B \end{pmatrix} = \begin{pmatrix} \eta_R^R & \eta_R^G & \eta_R^B \\ \eta_G^R & \eta_G^G & \eta_G^B \\ \eta_B^R & \eta_B^G & \eta_B^B \end{pmatrix} \cdot \begin{pmatrix} I^R \\ I^G \\ I^B \end{pmatrix}. \quad \text{Eq. (2)}$$

Therefore, $I^R$, $I^G$, $I^B$ can be obtained by solving Eq. (2), where the error of the crosstalk can be eliminated, as:

$$\begin{pmatrix} I^R \\ I^G \\ I^B \end{pmatrix} = \begin{pmatrix} \eta_R^R & \eta_R^G & \eta_R^B \\ \eta_G^R & \eta_G^G & \eta_G^B \\ \eta_B^R & \eta_B^G & \eta_B^B \end{pmatrix}^{-1} \cdot \begin{pmatrix} I_R \\ I_G \\ I_B \end{pmatrix}. \quad \text{Eq. (3)}$$

Finally, a linear polarizer was placed in front of the integrating sphere and the polarizer was rotated with a step of 2° and the images were captured with the filter as shown, for example, in FIG. 1C. The normalized averaged intensities obtained in these examples are plotted in FIG. 3, panel (a), showing the need of calibration. Here, a commonly-used calibration method is used, and the expression to stretch the maximum and minimum intensity can be written as:

$$I_{cal} = (I - I_{min})/(I_{max} - I_{min}). \quad \text{Eq. (4)}$$

Figure 3:
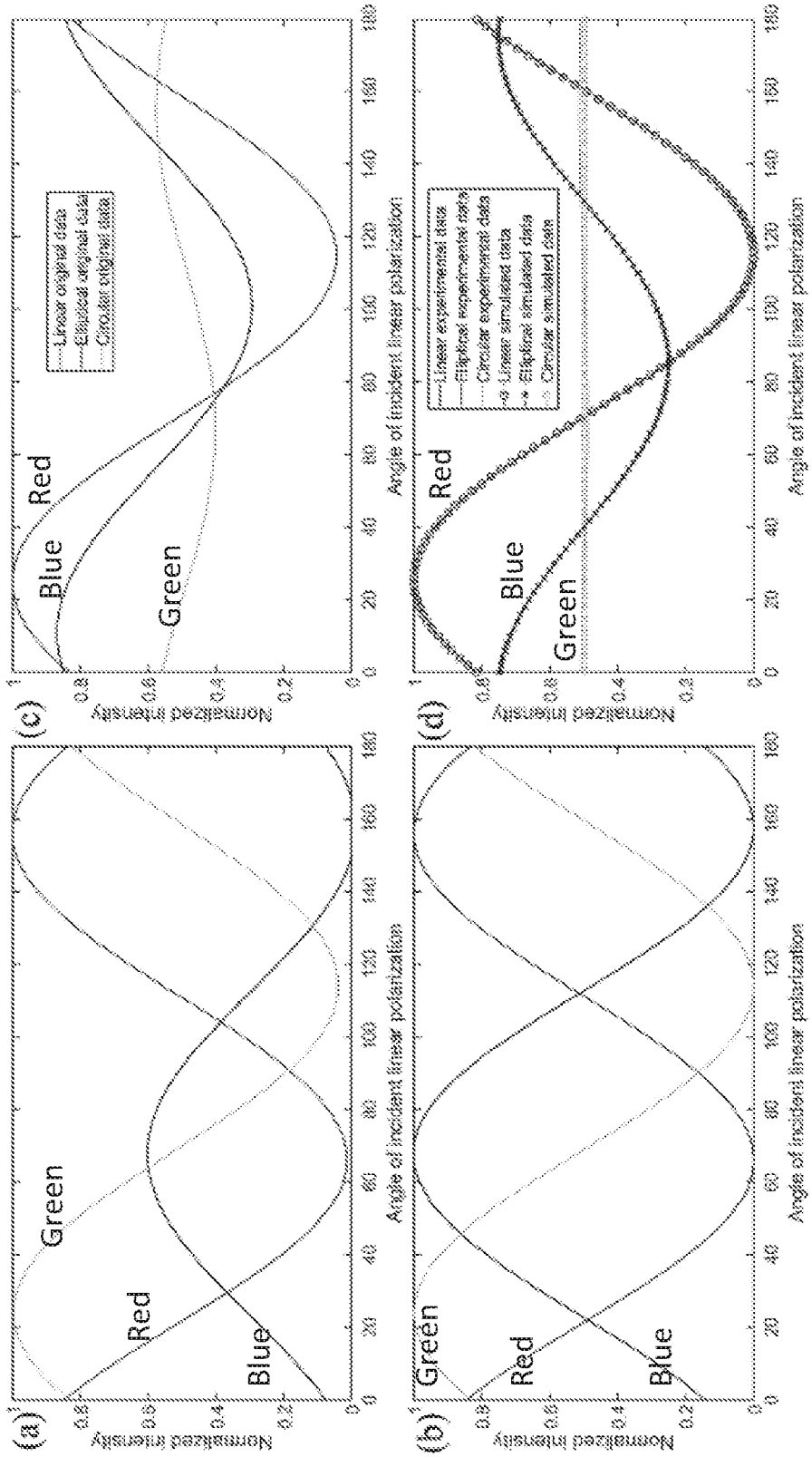
FIG. 3 illustrates dependencies of normalized averaged intensities on angle of linear polarization of incident light.

Here, $I_{max}$ and $I_{min}$ are the maximum and minimum values of the normalized averaged intensity. The calibrated normalized averaged intensities are shown in FIG. 3, panel (b), which demonstrates the linear polarized properties in RGB channels. The same calibration parameters can be used to calibrate the system when the circular and elliptical filters are used (e.g., the filter as shown in FIG. 1B and FIG. 2C). FIG. 3, panel (c) illustrates that the averaged intensity for circular polarizer is not a line due to the incoherent superposition effect before the calibration. However, after the calibration process, the incoherent superposition effect is almost eliminated as shown in FIG. 3, panel (d). To further estimate the error of the polarimetric imaging system, the simulation results are also shown in FIG. 3, panel (d). It is thus evident that the experimental data matches very well with the simulated data, and the maximum errors for the circular polarizer is less than 2%, and the elliptical polarizer is 2.5%.

Figure 4:
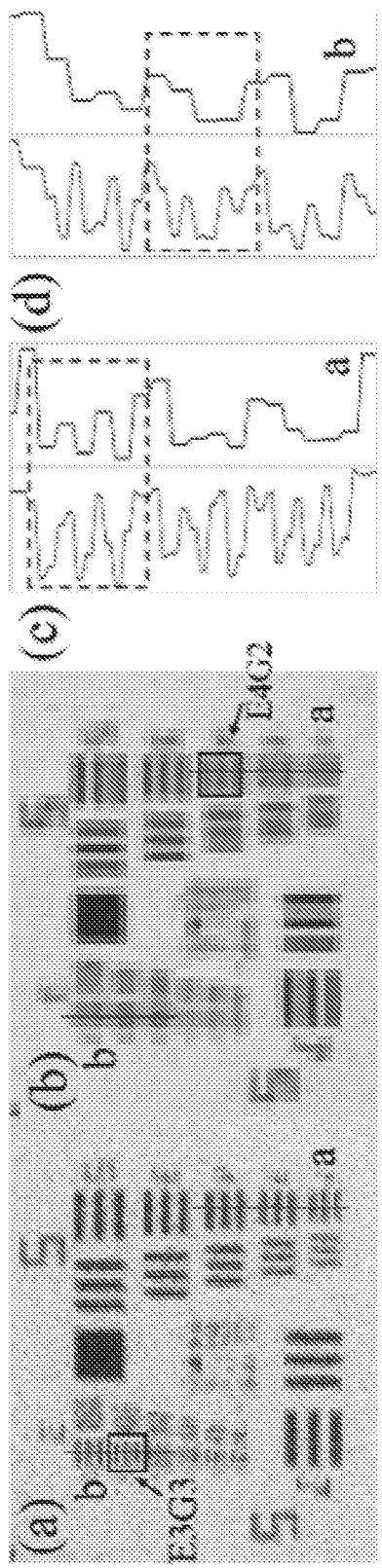
FIG. 4 illustrates a comparison between images of US Air Force resolution target captured using an example system according to the disclosed technology (panel (a)) and a commercial chromatic polarization camera.

One of the advantages of the disclosed polarimetric imaging system, as compared to the commercial chromatic polarization cameras with a focal plane polarizer array, is the high spatial resolution. It is known that, in the chromatic polarization camera, each pixel can only sense one polarization state of one color. Thus, 4×4 pixels are needed to obtain the color and polarization properties of one single object point. Using the disclosed techniques, the spatial resolution of the polarimetric imaging system is the same as conventional color cameras, which means the spatial resolution is two times higher than that of the commercial chromatic polarization cameras. FIG. 4, panel (a) and FIG. 4, panel (b) are the 0° polarized images of U.S. Air Force resolution target in the red channel captured using the disclosed system and the commercial chromatic polarization camera respectively. FIG. 4, panel (c) compares the elements of Group 3 (G3) in the images and FIG. 4, panel (d) compares the elements of Group 2 (G2) in the images. As shown in FIG. 4, panels (c)-(d), the disclosed system can resolve Element 3 in Group 3 (see E3G3 in FIG. 4, panel (a)), but the commercial chromatic polarization camera can only resolve Element 4 in Group 2 (see E4G2 in FIG. 4, panel (b)), which indicates that the resolution of the disclosed system is 1.78 times higher. The noise of the disclosed system as shown in FIG. 4, panel (a) can be higher because the low-cost conventional color camera has a higher noise, its contrast is lower due to the scattered light from the mechanical fixtures in the spectral-polarization filter, and/or the lower light efficiency.

As best understood, currently, there is no commercial polarization sensor that can simultaneously capture circular or elliptical polarization images together with linear polarization image. Using the disclosed techniques, however, it is extremely easy to capture different states of polarizations at the same time. The array configuration of the spectral-polarization filter also provides great configurability for different applications.

Figure 5:
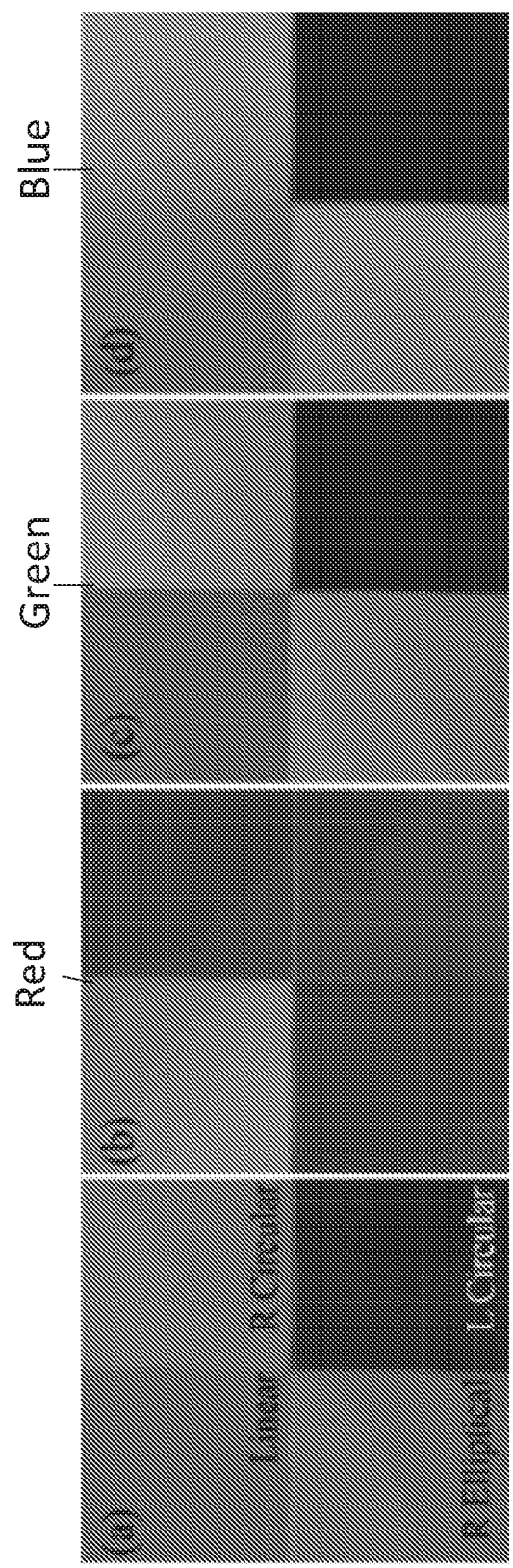
FIG. 5 illustrates example polarized images obtained using a system according to the disclosed technology.

In another example experimental setup, a filter as shown in FIG. 1B is used to demonstrate that linear, circular and elliptical polarized images can be obtained simultaneously in a snapshot. Achromatic quarter waveplates and polarizers can be used to construct an object which transmits linear, right circular, left circular and elliptical polarized light in four quadrants. A disclosed polarimetric imaging system is then used to capture light through this object. FIG. 5, panel (a) shows the captured color image of the four parts with linear polarized illumination light. FIG. 5, panel (b) displays the red channel of the image. In FIG. 5, panel (b), the region with linear polarizer is brighter and the other three regions are darker since the linear polarizer is set behind the red bandpass filter in the spectral-polarization filter. In FIG. 5, panel (c), the regions with right circular and right elliptical polarizers are brighter while the region with left circular polarizer is the darkest because the right circular polarizer is placed behind the green bandpass filter. FIG. 5, panel (d) shows the blue channel of the image where the region with left circular polarizer is the darkest because the right elliptical polarizer is next to the blue bandpass filter.

Figure 6:
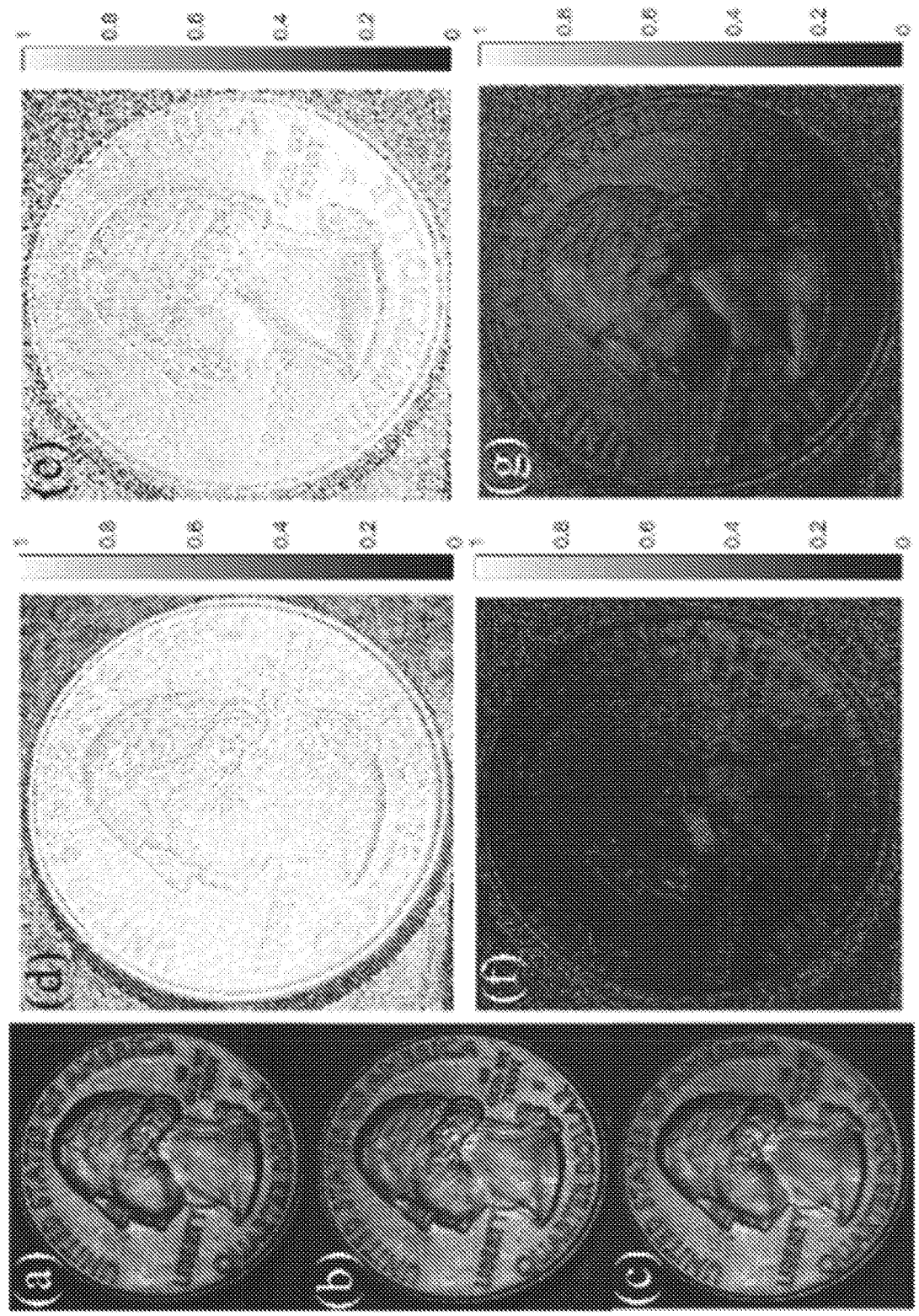
FIG. 6 illustrates example polarization images and degrees of linear, circular, and elliptic polarization.

Some reflectance imaging experiments have been carried out to further demonstrate the system reconfigurability. Reflectance images of a quarter coin illuminated with linear polarized white light are captured first. Here, filters as shown in FIGS. 1B-1D were used to extract different polarization states of the light reflected from the coin. The circular filter in FIG. 1B was replaced by left elliptical filter with the angle −30° between the waveplate and the polarizer, represented by E(−30). FIG. 6, panels (a)-(c) show the green channel images extracted from the images captured with the filters in FIGS. 1B-1D, which are the linear, circular and elliptical polarized images respectively.

The depolarization of the reflectance can be assumed as being wavelength independent because the object is made of metal. Therefore, the polarized state in RGB channels can be treated as being uniform. Here, the degrees of linear polarization (DoLP) and the degree of circular polarization (DoCP) are used to measure the polarized properties of the images. DoLP and DoCP are defined as:

$$DoLP = \frac{|I_0 - I_{90}|}{I_0 + I_{90}}, \quad \text{Eq. (5)}$$

$$DoCP = \frac{|2I_C - I_0 - I_{90}|}{I_0 + I_{90}}. \quad \text{Eq. (6)}$$

FIG. 6, panels (d)-(e) represent the DoLP calculated with polarized images captured by commercial polarization camera and with spectral-polarization filter in FIG. 1C respectively. The similarity between two DoLPs demonstrates the quantitative polarization imaging capability of the disclosed system. Furthermore, the letters in FIG. 6, panel (e) are clearer than those in FIG. 6, panel (d) due to higher spatial resolution of the disclosed system. FIG. 6, panel (f) shows the DoCP with the spectral-polarization filter in FIG. 1D. Due to the complex refractive index of the metal, the quarter coin partially depolarizes the linear polarized illumination light, showing some detailed surface information unavailable in the DoLP image, particularly along the edge of the features such as the letters. Similar to the method of calculating DoLP with orthogonal polarized images, the degree of elliptical polarization (DoEP) is defined as:

$$DoEP = \frac{|I_{E(30)} - I_{E(-30)}|}{I_{E(30)} + I_{E(-30)}}, \qquad \text{Eq. (7)}$$

Here, $I_{E(30)}$ and $I_{E(-30)}$ are the images of two elliptical channels. The calculated DoEP is shown in FIG. 6, panel (g), revealing even more information on surface features. From Eqs. (5)-(7), it can be seen that the degrees of linear, circular and elliptical polarization can be derived using different spectral-polarizer filters.

Figure 7:
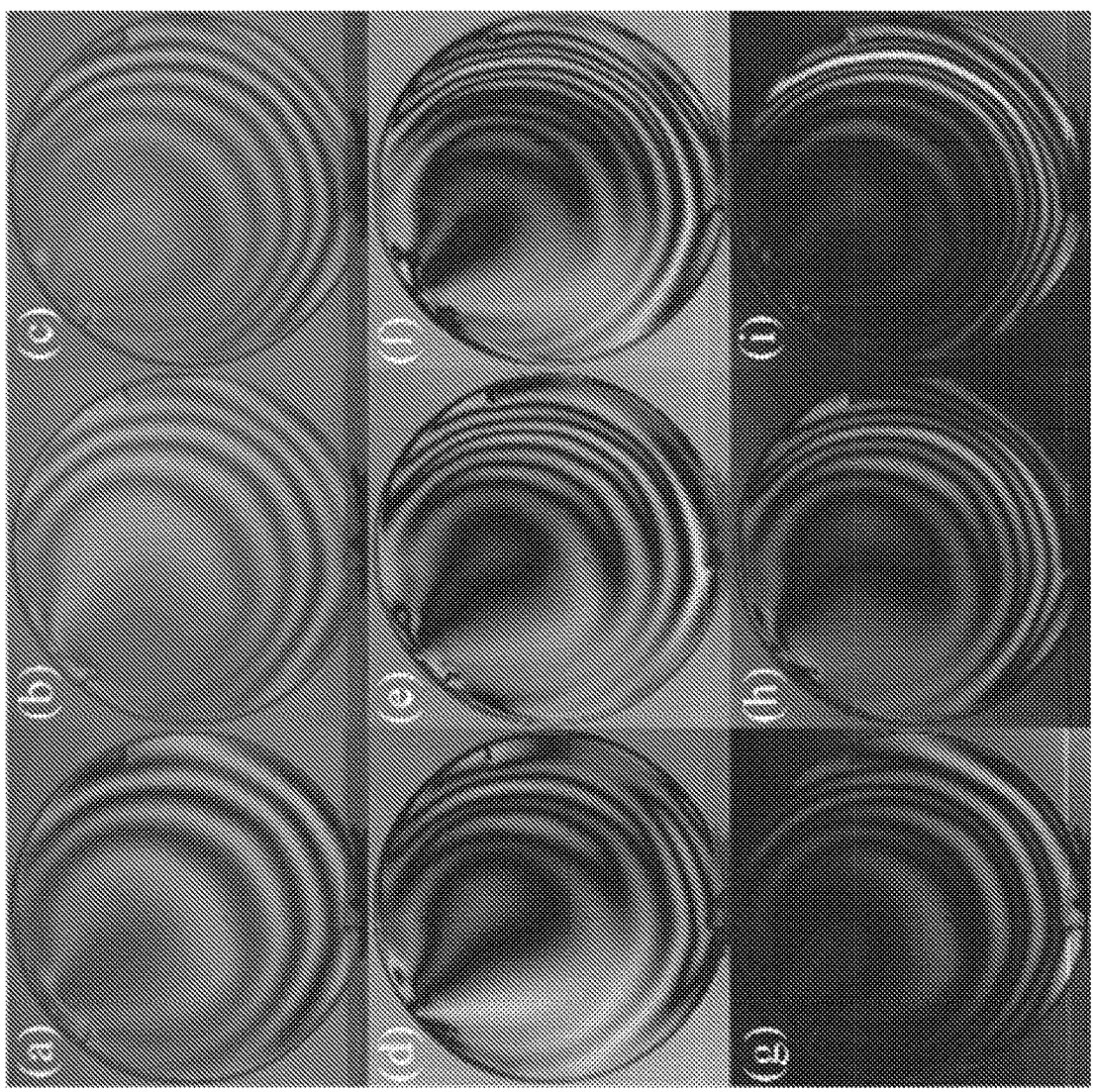
FIG. 7 illustrates example circularly polarized images of a plastic plate obtained using the disclosed technology.

In some cases, circular and elliptical components cannot be simultaneously identified using one single filter. For the object with spectrum-dependent polarization properties, while the polarization properties cannot be estimated accurately from the extracted polarization images at different spectral from a single image, it is easy to take one or two additional images by simply rotating the bandpass filter plate relatively to the polarizer plate to calculate DoLP and DoCP simultaneously. A plastic plate with uniform linearly polarized white light is used to demonstrate the feasibility. Three images were taken using the spectral-polarization filter shown in FIG. 1D. The center of the bandpass filter plate is coupled to the center of the polarization filter plate so that the bandpass filter plate can be rotated relatively to the polarization filter plate. FIG. 7, panels (a)-(c) are the circular polarized images from RGB channels in the three captured images respectively, demonstrating that the plastic plate has stronger birefringence in short wavelength as indicated by the increasing circular rings. With three captured color images, the DoLPs and DoCPs of the plastic plate in RGB channels can be calculated and are shown in FIG. 7, panels (d)-(f) and FIG. 7, panels (g)-(i) respectively, showing the strong spectrum-dependent polarization properties due to the internal stress. Those images also show that the birefringence becomes stronger from red to blue wavelength. However, while it is necessary to rotate spectral-polarization filters in order to obtain accurate polarization measurement for some wavelength-dependent objects, accurate measurement is not necessary for some other wavelength-dependent objects where it is only necessary to locate the region of interest, for example quality control in injection molding.

It is thus evident that the disclosed technique herein can be implemented to obtain a simple, low-cost reconfigurable snapshot polarimetric imaging system based on spectral-polarization filtering. To facilitate reconfigurability, the spectral-polarization filter can be positioned at the aperture stop (or at the entrance pupil of the system) using one or more brackets or mounts that allows ready replacement (e.g., swapping in and out) of the spectral or polarization arrays. The mount/bracket can be further designed to facilitate calibration and alignment of the filter with respect to other components of the system. For example, the mount or bracket can be movable in both x-, y- and z-directions, and can be further configured to rotate to provide different combinations of spectral-polarization filtering, as discussed earlier.

Experimental results demonstrate that, for wavelength-independent applications, the disclosed polarimetric imaging technique can obtain linear, circular or elliptical polarization information in a snapshot depending on the combination of the spectral-polarization filter. For wavelength-dependent applications, the full polarization information for each color channel can also be obtained by changing or rotating the spectral-polarizer filters.

Compared to the expensive commercial polarization camera with focal plane pixelated linear polarizer array (which can cost over $2,000), the disclosed techniques provide at least two key advantages. The first is that the spatial resolution is higher without instantaneous field-of-view (IFOV) error. In addition, the pixel number can be much higher than that in the commercial polarization cameras. The second advantage is the reconfigurability of the filter. The measurable polarization properties are not limited by the built-in focal plane pixelated linear polarizer array. By replacing the spectral-polarization filter, various wavelength-dependent polarization properties, including circular and elliptical polarization properties, can be measured. This is particularly valuable to measure wavelength-dependent polarization properties with unconventional spectral camera, such as RGB-NIR camera.

Figure 8:
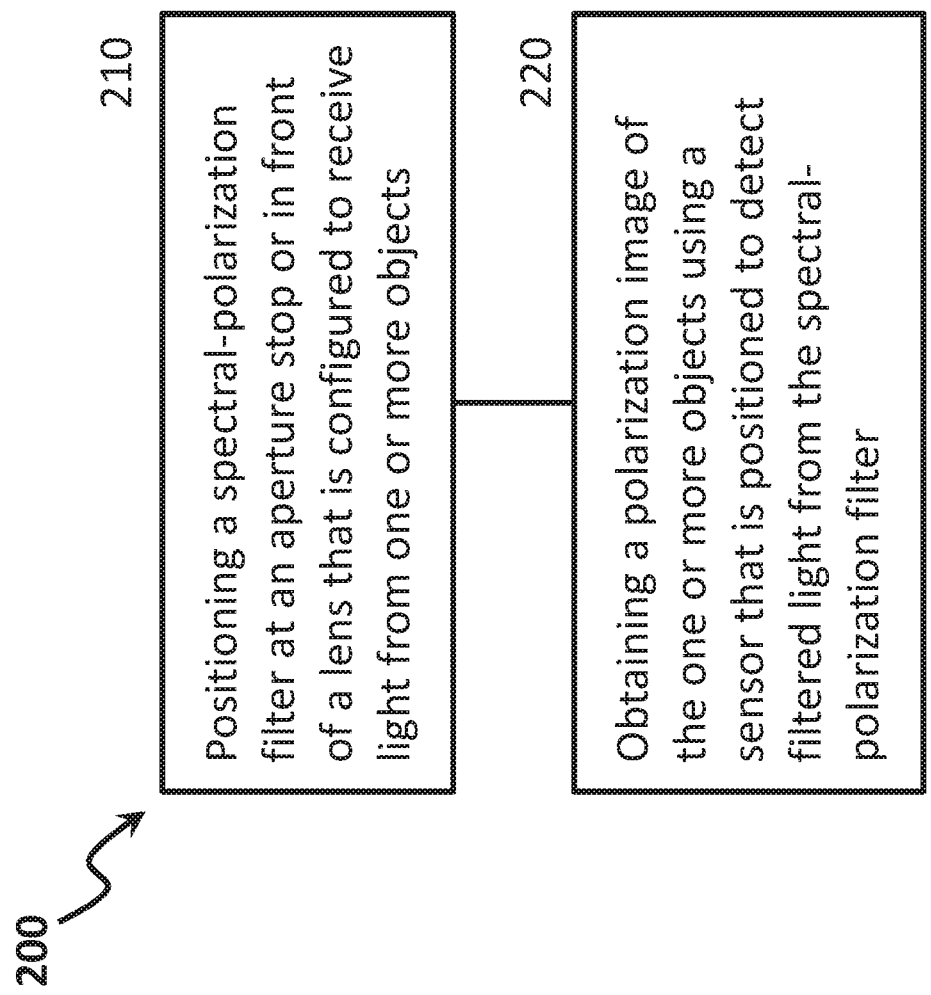
FIG. 8 illustrates a set of operations for polarization imaging according to an example embodiment.

FIG. 8 shows a flow diagram of an example embodiment of a method 200 for polarization imaging according to the disclosed technology. The method 200 includes a process 210 of positioning a spectral-polarization filter at an aperture stop or in front of a lens that is configured to receive light from one or more objects, wherein the spectral-polarization filter comprises a first array of multiple spectral filters and a second array of multiple polarizers. The method 200 further includes a process 220 of obtaining a polarization image of the one or more objects using a sensor that is positioned to detect filtered light from the spectral-polarization filter.

In some example embodiments, the multiple polarizers include at least one of a linear, circular, or an elliptical polarizer. In another example embodiment, the multiple polarizers include polarizers that are configured to produce different polarization states. In yet another example embodiment, the multiple spectral filters include at least three bandpass filters. In some example embodiments, each of the multiple polarizers is configured to change either a degree or a state of polarization of light incident thereon.

In some example embodiments, the method described in FIG. 8 further includes rotating one or both of the first array of the multiple spectral filters or the second array of the multiple polarizers with respect to each other to obtain different combinations of the multiple spectral filters and the multiple polarizers. In another example embodiment, the method includes replacing one or both of the first array of the multiple spectral filters or the second array of the multiple polarizers with another array of multiple spectral filters or multiple polarizers to obtain a different combination of the multiple spectral filters and the multiple polarizers.

The disclosed technology can be used for different applications, including but not limited to, imaging, security, underwater imaging, 3D imaging and reconstruction, and other areas of technology that can benefit from a low cost and reconfigurable polarization imaging system.

One aspect of the disclosed technology relates to a polarization imaging system that includes a first lens or set of lenses positioned to receive light from one or more objects; and a spectral-polarization filter positioned at an aperture stop of the polarization imaging system to filter the received light, the spectral-polarization filter comprising an array of multiple spectral filters and an array of multiple polarizers that are positioned in cascade to modify both spectral content and polarization of the light that enters the spectral-polarization filter; wherein the light that exits the spectral-polarization filter is directed to a sensor positioned to detect filtered light from the spectral-polarization filter at an image plane of the polarization imaging system.

In some example embodiments, the polarization imaging system comprises a second lens or a set of lenses positioned between the spectral-polarization filter and the image plane to direct the filtered light from the spectral-polarization filter to the sensor. In other example embodiments, the multiple polarizers of the polarization imaging system include at least one of a linear, circular, or an elliptical polarizer, and wherein each of the polarizes is configured to change either a degree or a state of polarization of light incident thereon. In an example embodiment, the multiple polarizers of the polarization imaging system include polarizers that are configured to produce different polarization states. In an example embodiment of the polarization imaging system, the multiple spectral filters include at least three bandpass filters. In yet another example embodiment of the polarization imaging system, the spectral-polarization filter comprises a layer of transparent material positioned between the array of multiple spectral filters and the array of multiple polarizers. In some example embodiments, the transparent material includes a parallel plate glass. In some example embodiments, centers of the array of multiple spectral filters and the array of multiple polarizers are aligned with respect to one another to allow rotation of one array with respect to the other array. In some example embodiments, the polarization imaging system includes the sensor that comprises a spectral filter that allows different spectral ranges of light to pass therethrough. In an example embodiment of the polarization imaging system, a spatial resolution of an image captured by the sensor in the presence of the spectral-polarization filter is unchanged from a spatial resolution of an image captured by the sensor without the spectral-polarization filter. In an example embodiment of the polarization imaging system, the sensor includes a red-green-blue (RGB) filter or an RGB-near-infrared (RGB-NIR) filter. In some example embodiments, one or both of the array of multiple spectral filters or the array of multiple polarizers is removably positioned in the polarization imaging system to allow replacement of one or both of the arrays with another array of multiple spectral filters or multiple polarizers.

Another aspect of the disclosed technology relates to a polarization imaging system that includes a spectral-polarization filter positioned at an entrance lens of the polarization imaging system to filter light received from an object, the spectral-polarization filter comprising an array of multiple spectral filters and an array of multiple polarizers that are positioned in cascade to modify both spectral content and polarization of the light that enters the spectral-polarization filter; and a mount or a bracket configured to hold the spectral-polarization filter at the entrance lens, and to allow one or both of the array of multiple spectral filters or the array of multiple polarizers to be replaced with another array of multiple spectral filters or multiple polarizers, wherein the light that exits the spectral-polarization filter is directed to a sensor positioned to detect filtered light from the spectral-polarization filter at an image plane of the polarization imaging system.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

It is understood that the various disclosed embodiments may be implemented individually, or collectively, in devices comprised of various optical components, electronics hardware and/or software modules and components. These devices, for example, may comprise a processor, a memory unit, an interface that are communicatively connected to each other, and may range from desktop and/or laptop computers, to mobile devices and the like. The processor and/or controller can perform various disclosed operations based on execution of program code that is stored on a storage medium. The processor and/or controller can, for example, be in communication with at least one memory and with at least one communication unit that enables the exchange of data and information, directly or indirectly, through the communication link with other entities, devices and networks. The communication unit may provide wired and/or wireless communication capabilities in accordance with one or more communication protocols, and therefore it may comprise the proper transmitter/receiver antennas, circuitry and ports, as well as the encoding/decoding capabilities that may be necessary for proper transmission and/or reception of data and other information. For example, the processor may be configured to receive electrical signals or information from the disclosed sensors (e.g., CMOS sensors), and to process the received information to produce images or other information of interest.

Various information and data processing operations described herein may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes Only a few implementations and examples are described and other implementations, enhancements and variations can be made based on what is described and illustrated in this patent document.

What is claimed is:

1. A polarization imaging system, comprising:
   a first lens positioned at an entrance of the polarization imaging system and covering a full field of view of the polarization imaging system to receive light from one or more objects; and
   a spectral-polarization filter positioned at an aperture stop of the polarization imaging system to filter the received light, the spectral-polarization filter comprising an array of multiple spectral filters and an array of multiple polarizers that are positioned in cascade to modify both spectral content and polarization of the light that enters the spectral-polarization filter; wherein
   the light that exits the spectral-polarization filter is directed to a sensor positioned to detect filtered light from the spectral-polarization filter at an image plane of the polarization imaging system.

2. The system of claim 1, comprising a second lens or a set of lenses positioned between the spectral-polarization filter and the image plane to direct the filtered light from the spectral-polarization filter to the sensor.

3. The system of claim 1, wherein the multiple polarizers include at least one of a linear, circular, or an elliptical polarizer, and wherein each of the polarizes is configured to change either a degree or a state of polarization of light incident thereon.

4. The system of claim 1, wherein the multiple polarizers include polarizers that are configured to produce different polarization states.

5. The system of claim 1, wherein the multiple spectral filters include at least three bandpass filters.

6. The system of claim 1, wherein the spectral-polarization filter comprises a layer of transparent material positioned between the array of multiple spectral filters and the array of multiple polarizers.

7. The system of claim 6, wherein the transparent material includes a parallel plate glass.

8. The system of claim 1, wherein centers of the array of multiple spectral filters and the array of multiple polarizers are aligned with respect to one another to allow rotation of one array with respect to the other array.

9. The system of claim 1, wherein the polarization imaging system includes the sensor that comprises a spectral filter that allows different spectral ranges of light to pass therethrough.

10. The system of claim 9, wherein a spatial resolution of an image captured by the sensor in the presence of the spectral-polarization filter is unchanged from a spatial resolution of an image captured by the sensor without the spectral-polarization filter.

11. The system of claim 9, wherein the sensor includes a red-green-blue (RGB) filter or an RGB-near-infrared (RGB-NIR) filter.

12. The system of claim 1, wherein one or both of the array of multiple spectral filters or the array of multiple polarizers is removably positioned in the polarization imaging system to allow replacement of one or both of the arrays with another array of multiple spectral filters or multiple polarizers.

13. A polarization imaging system, comprising:
    a spectral-polarization filter positioned at an entrance lens of the polarization imaging system to filter light received from an object, the entrance lens covering a full field of view of the polarization imaging system, the spectral-polarization filter comprising an array of multiple spectral filters and an array of multiple polarizers that are positioned in cascade to modify both spectral content and polarization of the light that enters the spectral-polarization filter; and
    a mount or a bracket configured to hold the spectral-polarization filter at the entrance lens, and to allow one or both of the array of multiple spectral filters or the array of multiple polarizers to be replaced with another array of multiple spectral filters or multiple polarizers, wherein
    the light that exits the spectral-polarization filter is directed to a sensor positioned to detect filtered light from the spectral-polarization filter at an image plane of the polarization imaging system.

14. A method for polarization imaging, comprising:
    positioning a spectral-polarization filter at an aperture stop or in front of an entrance lens that is configured to receive light from one or more objects, the entrance lens covering a full field of view of the polarization imaging system and wherein the spectral-polarization filter comprises a first array of multiple spectral filters and a second array of multiple polarizers; and
    obtaining a polarization image of the one or more objects using a sensor that is positioned to detect filtered light from the spectral-polarization filter.

15. The method of claim 14, wherein the multiple polarizers include at least one of a linear, circular, or an elliptical polarizer.

16. The method of claim 14, wherein the multiple polarizers include polarizers that are configured to produce different polarization states.

17. The method of claim 14, wherein the multiple spectral filters include at least three bandpass filters.

18. The method of claim 14, further comprising:
    rotating one or both of the first array of the multiple spectral filters or the second array of the multiple polarizers with respect to each other to obtain different combinations of the multiple spectral filters and the multiple polarizers.

19. The method of claim 14, further comprising:
    replacing one or both of the first array of the multiple spectral filters or the second array of the multiple polarizers with another array of multiple spectral filters or multiple polarizers to obtain a different combination of the multiple spectral filters and the multiple polarizers.

20. The method of claim 14, wherein each of the multiple polarizers is configured to change either a degree or a state of polarization of light incident thereon.

21. The polarization imaging system of claim 1, wherein the first lens is part of lens system comprising additional lenses that are positioned in cascade behind the first lens.

* * * * *